April 27, 1926.

S. L. HANCOCK 1,582,598

ANTIFRICTION SWIVEL CASTER

Filed April 13, 1923   2 Sheets-Sheet 1

INVENTOR
Samuel L. Hancock,
BY
Everett W. Rook,
ATTORNEYS.

April 27, 1926.
S. L. HANCOCK
1,582,598
ANTIFRICTION SWIVEL CASTER
Filed April 13, 1923      2 Sheets-Sheet 2
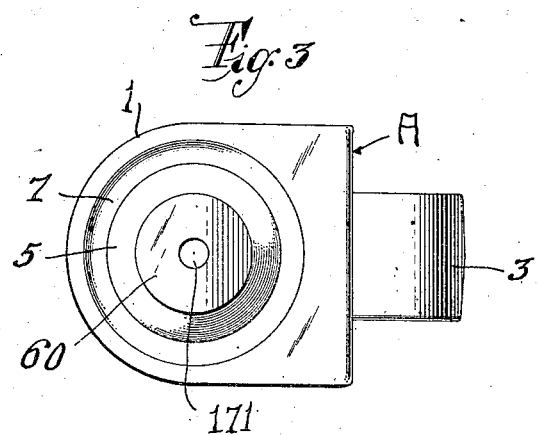
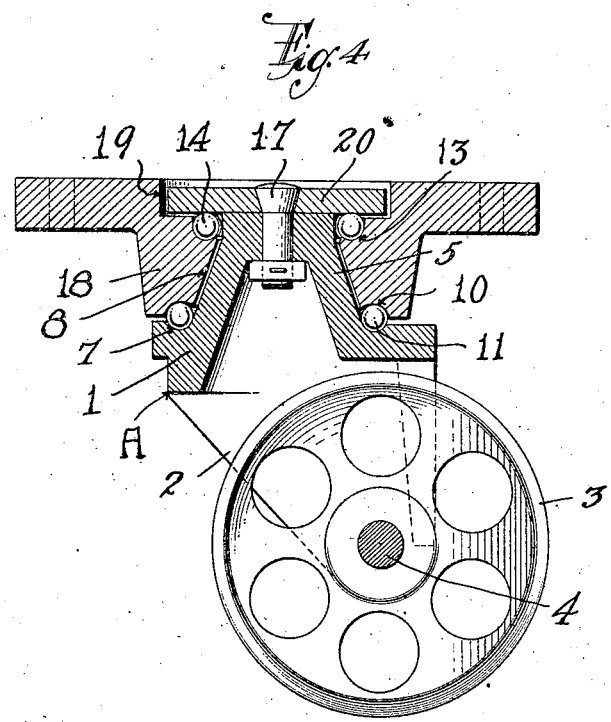
INVENTOR
Samuel L. Hancock,
BY
Everett W. Rook, ATTORNEYS.

Patented Apr. 27, 1926.

1,582,598

UNITED STATES PATENT OFFICE.

SAMUEL L. HANCOCK, OF ROME, GEORGIA, ASSIGNOR TO THE FAIRBANKS COMPANY, A CORPORATION OF NEW JERSEY.

ANTIFRICTION SWIVEL CASTER.

Application filed April 13, 1923. Serial No. 631,777.

*To all whom it may concern:*

Be it known that I, SAMUEL L. HANCOCK, a citizen of the United States, and a resident of Rome, in the county of Floyd and State of Georgia, have invented new and useful Improvements in Antifriction Swivel Casters, of which the following is a specification.

This invention relates in general to a caster of the type including a load-bearing or attaching member and a wheel-carrying member anti-frictionally swiveled to permit the wheel to easily and quickly change its direction of movement in accordance with the movement of the load and with a minimum amount of friction between said load-bearing and wheel-carrying members.

The primary objects of the invention are to provide a caster of the character described embodying novel and improved features of construction which has a maximum strength and durability for the amount of material used in its construction, which is susceptible of construction in both large and small sizes and for a large variety of uses, which ensures a minimum amount of friction between the swiveled members, and which is at the same time simple and inexpensive in construction.

Another object is to provide a caster of this character embodying novel constructions and arrangement of the load-bearing and wheel-carrying members which effectively assumes the strains incident to the tendency to relative tilting of said members, which ensures against injury to either of said members by such strains, and reduces to a minimum the friction between said members under such strains.

A further object is to provide a novel and improved construction and arrangement of two anti-friction bearings in which one bearing assumes only and all of the thrusts incident to the tendency to relative tilting of the load-bearing and wheel-carrying members and translates the composite lateral and axial thrusts incident to such tilting so as to transmit them to the load-carrying member only in a direction substantially parallel with the axis of swivel, while the other anti-friction bearing assumes substantially the whole load on the caster and the purely lateral thrusts incident to movement of the object on which the caster is mounted and reduces the tendency to relative tilting of the wheel-carrying and load-bearing members, said construction and arrangement permitting both bearings to operate without interfering with the operation of the other and ensuring automatic relative adjustment of the wheel-carrying and load-bearing members so that the balls of the two races always move in substantially true circular paths concentric with the axis of swivel and without possibility of binding or becoming jammed.

The invention further contemplates other results and advantages as will appear more fully from the following description and accompanying drawings in which Figure 1 is a vertical longitudinal sectional view through a caster embodying my invention;

Figure 3 is a top plan view of the wheel-supporting yoke or wheel-carrying member, and Figure 4 is a view similar to Figure 1 showing the modified construction of the load-bearing member.

Figure 1:
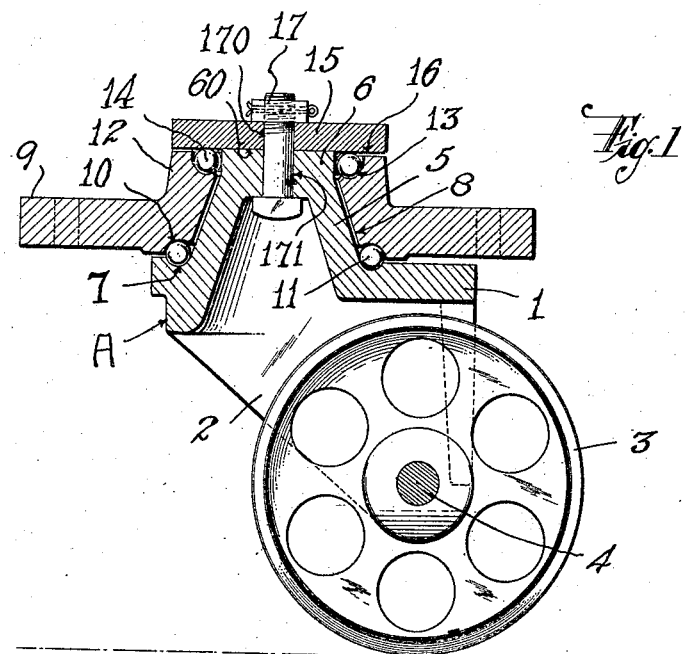

In the embodiment of the invention shown in Figures 1 and 3 inclusive of the drawings, the reference character A designates a wheel supporting yoke or carrying member including a body portion 1 having depending spaced arms 2 between which is journaled a wheel 3 on a shaft 4. The top of said wheel-carrying member is formed with a hollow frusto-conical projection or journal 5, the upper portion of which is substantially cylindrical as at 6 and formed with a flat end 60, the top of the body portion of the said wheel-carrying member being also formed with a ball race 7 arranged closely adjacent the base of the journal 5 and coaxial therewith.

The journal 5 of the wheel-carrying member is adapted to loosely fit within a correspondingly shaped frusto-conical opening 8 in a load-bearing member or plate 9 for attaching the caster to an object. The lower face of said load-bearing member is provided with a ball race 10 cooperating with the ball race 7 in the wheel-carrying member A, balls 11 being arranged in the races 7 and 10. The upper face of the load-bearing member 9 is formed with an annular rib or flange 12, the inner edge of which is formed with a ball race 13 co-axial with the ball races 7 and 10, said race having balls 14 arranged therein and being of such a depth that the balls 14 will project slightly above the upper edge of the rib 12. The ball race 13 is also of such a size as to provide a path of movement for the balls 14 smaller in diameter than the path of movement of the balls 11.

The journal 5 of the wheel-carrying member projects through the opening 8 of the load-bearing member 9 with its end 60 substantially flush with the upper sides of the balls 14, and a bearing plate 15 having a substantially flat side 16 is rigidly secured to the end 60 of the journal 5 in any suitable manner, as by a bolt 17 passing through openings 170 and 171 in said plate and the end of the journal 5. The plate 15 overlies the ball race 13 substantially parallel thereto, and the flat side 16 directly engages the balls 14. The wheel-carrying member A is swiveled in the load-bearing member 9 on the balls 11 and 14, the parts of the caster being held in this assembled relation by the plate 15 and bolt 17. The axis of swivel of the said load-bearing and wheel-carrying members is arranged at one side of the axis of the wheel 3 in the usual manner so that said wheel normally trails and is susceptible of changing its direction of movement in accordance with the movement of the object to which the caster is attached by revolution of the wheel-carrying member in the load-bearing member.

In the operation of the caster, the load or weight of the object is assumed by the balls 11, and the tendency to relative tilting of the wheel-carrying member and load-bearing member due to the weight of the object and the offsetting of the axis of swivel from the axis of the wheel 3, is assumed by the balls 14 through the bearing plate 15. The flat side 16 of said bearing plate transmits the thrust incident to such tilting to the load-bearing member 9 in a direction substantially co-axial with the swivel connection, so that there is no tendency to force the balls 14 out of a circular path concentric with the axis of swivel and jamming or binding the same. The purely lateral thrusts incident to movement of the object are assumed by the balls 11, and the flat side 16 of the bearing plate permits automatic relative lateral adjustment of the load-bearing and wheel-carrying members to allow the balls 11 always to travel in a circular path concentric with the axis of swivel without jamming or binding and without disturbing the positions of the balls 14. Also the relative arrangement of the balls 11 and 14 and the relative diameters of the paths of movement of said balls 11 and 14 reduce the tendency to relative tilting of the load-bearing and wheel-carrying members, and the frusto-conical hollow shape of the journal 5 of the wheel-carrying member provides a maximum strength for the amount of material used to resist lateral thrusts on the caster and transmit the same to the balls 14. Furthermore, the flat side 16 of the bearing plate 15 relieves the bolt 17 of considerable strain by permitting relative lateral movement of the plate and balls 14 and translating the composite lateral and axial thrust on the plate into a substantially axial thrust. The substantially cylindrical portion of the journal 5 serves only to prevent displacement of the balls 14 from the race 13 when the bearing plate 15 is removed and does not provide a bearing for said balls. The construction described also provides for minimum friction between the load-bearing and wheel-carrying members so that the caster is extremely sensitive and permits the change in direction of movement of the wheel 3 with a minimum tendency thereof to drag.

Figure 2:
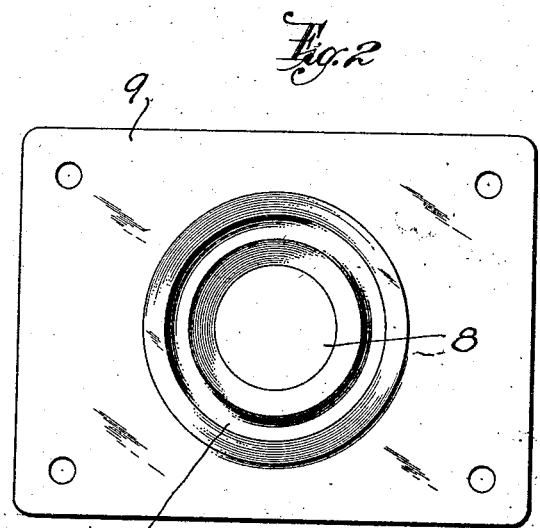
Figure 2 is a bottom plan view of the attaching plate or load-bearing member.

In Figure 4 of the drawings I have shown a slight modification in the construction of the load-bearing member 9 to adapt the caster for particular uses for which the caster shown in Figures 1 to 3 inclusive, is not desirable. In this form of the invention the underside of the load-bearing member 9 is formed with an annular flange or rib 18 in the outer edge of which is formed the ball race 10. The top of the load-bearing member is formed with a circular recess 19 in the base of which is formed the ball race 13. The bearing plate 20 is of a diameter slightly less than the diameter of the recess 19, and the top 60 of the frusto-conical journal 5 of the wheel-carrying member is positioned a sufficient distance below the top of the load-bearing member 9 to permit the plate 20 to be arranged in the recess 19 with its top below the top surface of the load-bearing member. The construction and operation of this form of caster is otherwise identical with that shown in Figures 1 to 3, inclusive.

The ball races 7, 10 and 14 formed at the ends of the opening 8 preferably meet the edges thereof and the race 7 is preferably arranged closely adjacent the base of the journal 5, or meets the walls thereof as shown, so that an extremely compact arrangement of the parts and a maximum strength in the caster obtained.

I am aware of such constructions as shown in Patents No. 1,033,256, J. G. Ludwig, July 23, 1912, and No. 1,344,864, J. L. Chestnutt, June 29, 1920, and do not desire to be understood as attempting to claim such constructions. Obviously, the details of my caster may be modified or changed by those skilled in the art without departing from the spirit or scope of the invention, and I do not desire to be understood as limiting myself except as required by the following claims when construed in the light of the prior art.

Having thus described the invention, what I claim is:

1. A caster comprising a wheel-carrying member having a wheel journaled therein and formed with a journal and a ball race substantially co-axial with said journal, a load-bearing member adapted to be attached to an object to be supported and formed with an opening to loosely receive said journal of the wheel-carrying member, said load-bearing member being formed with two ball races spaced longitudinally of said opening and each co-axial with said opening, one of said ball races cooperating with said ball race of the wheel-carrying member to receive balls therebetween, balls mounted in said ball races, and a bearing plate secured to said journal of the wheel-carrying member and formed with a flat surface substantially parallel to the plane of the other of said ball races in the load-bearing member and directly engaging the balls therein so that said plate is free for movement transversely of said ball race and also connects said load-bearing member and said wheel-carrying member.

2. A caster comprising a wheel-carrying member having a wheel journaled therein and formed at its top with a frusto-conical journal and a ball race arranged at the base of said journal and co-axial therewith, a load-bearing member to be attached to an object to be supported and formed with a frusto-conical opening loosely receiving said journal, said load-bearing member having a ball race at the edge of each end of said opening thereof and concentric therewith, said ball races being oppositely facing and of different diameters and the larger one cooperating with said ball race in said wheel-carrying member to receive balls therebetween, balls in said ball races, and a bearing plate secured to the outer end of said journal on the wheel-carrying member in spaced relation to said load-bearing member overlying and substantially parallel with the plane of the smaller one of said ball races of the load-bearing member and having a flat surface directly engaging the balls in said smaller ball race.

3. A caster comprising a wheel-carrying member having a wheel journaled therein and formed at its top with a frusto-conical journal and a ball race at the base of said journal and co-axial therewith, the said ball race merging in continuity into the outer peripheral wall of said journal, a load-bearing member to be attached to an object to be supported and formed with a frusto-conical opening loosely receiving said journal, said load-bearing member having a ball race at each end of said opening and concentric therewith, the one of said ball races at the large end of said opening merging into the walls thereof and cooperating with said ball race in the wheel-carrying member to receive balls and the one of said ball races at the small end of said opening in the load-bearing member facing oppositely from said ball race at the large end, balls mounted in all of said ball races, and a bearing plate secured to the outer end of said journal in spaced relation to said load-bearing member overlying said ball race in the small end of the opening in said load-bearing member and having a flat surface substantially parallel to the plane of said ball race and directly engaging the balls in said race so that said plate is free for movement transversely of said race, said plate also serving to connect said load-bearing member and said wheel-carrying member.

SAMUEL L. HANCOCK.